(12) United States Patent
Kirchhoff et al.

(10) Patent No.: US 9,432,494 B1
(45) Date of Patent: *Aug. 30, 2016

(54) METHODS AND SYSTEMS FOR CREATING A DYNAMIC CALL LOG AND CONTACT RECORDS

(71) Applicant: CALLWAVE COMMUNICATIONS, LLC, Brookline, MA (US)

(72) Inventors: Leland W. Kirchhoff, Santa Barbara, CA (US); David S. Trandal, Santa Barbara, CA (US)

(73) Assignee: Callwave Communications, LLC, Brookline, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,348

(22) Filed: Nov. 17, 2015

Related U.S. Application Data

(63) Continuation of application No. 14/502,862, filed on Sep. 30, 2014, now Pat. No. 9,203,955, which is a continuation of application No. 13/957,167, filed on Aug. 1, 2013, now Pat. No. 8,861,694, which is a (Continued)

(51) Int. Cl.
*H04M 1/56* (2006.01)
*H04M 1/2745* (2006.01)

(Continued)

(52) U.S. Cl.
CPC . *H04M 1/274508* (2013.01); *H04M 1/274533* (2013.01); *H04M 1/575* (2013.01); *H04M 3/42042* (2013.01)

(58) Field of Classification Search
USPC ............ 379/142.01, 142.02, 142.06, 210.01
See application file for complete search history.

(56) References Cited

U.S. PATENT DOCUMENTS

| 3,936,613 A | 2/1976 | Nishigori et al. |
| 3,956,595 A | 5/1976 | Sobanski |

(Continued)

FOREIGN PATENT DOCUMENTS

| EP | 0 509 945 A2 | 10/1992 |
| EP | 1 120 954 | 8/2001 |

(Continued)

OTHER PUBLICATIONS

Johnson, Dave; Article; "Now You're Talking—voice-response systems for home offices—Product Information"; http://www.findarticles.com; Feb. 1999.

(Continued)

*Primary Examiner* — Quynh Nguyen
(74) *Attorney, Agent, or Firm* — Knobbe, Martens, Olson & Bear LLP

(57) ABSTRACT

The present invention is related to telecommunications, and in particular, to methods and systems for processing call signaling data. In an embodiment, a call processing system receives a first message from a switch while the switch is processing a call for a calling party, wherein the first message is initiated at least partly in response to a firing of a call event trigger configured within a switch. The first message includes call signaling information, including the calling party's phone number. The calling party's phone number is stored in the call processing system. A communication channel is established over a network between the call processing system and a computer associated with the called party. A message is transmitted to the networked computer, the message including the calling party's phone number, wherein the calling party's phone number is intended to be displayed on the networked computer associated with the called party.

19 Claims, 8 Drawing Sheets

Related U.S. Application Data continuation of application No. 12/942,366, filed on Nov. 9, 2010, now Pat. No. 8,503,637, which is a continuation of application No. 11/366,989, filed on Mar. 2, 2006, now Pat. No. 7,839,987, which is a continuation-in-part of application No. 10/818,090, filed on Apr. 5, 2004, now Pat. No. 7,266,185, which is a continuation of application No. 10/033,020, filed on Nov. 1, 2001, now Pat. No. 6,738,461.

(51) Int. Cl.
*H04M 3/42* (2006.01)
*H04M 1/57* (2006.01)

(56) References Cited

U.S. PATENT DOCUMENTS

| | | |
|---|---|---|
| 4,009,337 A | 2/1977 | Sakai et al. |
| 4,022,983 A | 5/1977 | Braun et al. |
| 4,485,470 A | 11/1984 | Reali |
| 4,736,405 A | 4/1988 | Akiyama |
| 4,809,321 A | 2/1989 | Morganstein et al. |
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,291,302 A | 3/1994 | Gordon et al. |
| 5,404,537 A | 4/1995 | Olnowich et al. |
| 5,434,908 A | 7/1995 | Klein |
| 5,459,584 A | 10/1995 | Gordon et al. |
| 5,467,388 A | 11/1995 | Redd, Jr. et al. |
| 5,526,524 A | 6/1996 | Madduri |
| 5,533,102 A | 7/1996 | Robinson et al. |
| 5,533,106 A | 7/1996 | Blumhardt |
| 5,577,111 A | 11/1996 | Iida et al. |
| 5,583,918 A | 12/1996 | Nakagawa |
| 5,619,557 A | 4/1997 | Van Berkum |
| 5,640,677 A | 6/1997 | Karlsson |
| 5,651,054 A | 7/1997 | Dunn et al. |
| 5,668,861 A | 9/1997 | Watts |
| 5,751,795 A | 5/1998 | Hassler et al. |
| 5,774,067 A | 6/1998 | Olnowich et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,835,573 A | 11/1998 | Dee et al. |
| 5,894,504 A | 4/1999 | Alfred et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,995,594 A | 11/1999 | Shaffer et al. |
| 5,995,603 A | 11/1999 | Anderson |
| 6,014,436 A | 1/2000 | Florence et al. |
| 6,032,051 A | 2/2000 | Hall et al. |
| 6,034,956 A | 3/2000 | Olnowich et al. |
| 6,035,031 A | 3/2000 | Silverman |
| 6,044,059 A | 3/2000 | Olnowich |
| 6,078,581 A | 6/2000 | Shtivelman et al. |
| 6,085,231 A | 7/2000 | Agraharam |
| 6,104,800 A | 8/2000 | Benson |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,175,622 B1 | 1/2001 | Chiniwala et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,243,378 B1 | 6/2001 | Olnowich |
| 6,253,249 B1 | 6/2001 | Belzile |
| 6,278,704 B1 | 8/2001 | Creamer et al. |
| 6,282,269 B1 | 8/2001 | Bowater |
| 6,304,565 B1 | 10/2001 | Ramamurthy |
| 6,310,939 B1 | 10/2001 | Varney |
| 6,350,066 B1 | 2/2002 | Bobo, II |
| 6,353,660 B1 | 3/2002 | Burger et al. |
| 6,353,663 B1 | 3/2002 | Stevens et al. |
| 6,363,414 B1 | 3/2002 | Nicholls et al. |
| 6,405,035 B1 | 6/2002 | Singh |
| 6,411,601 B1 | 6/2002 | Shaffer et al. |
| 6,411,805 B1 | 6/2002 | Becker et al. |
| 6,438,216 B1 | 8/2002 | Aktas |
| 6,438,222 B1 | 8/2002 | Burg |
| 6,477,246 B1 | 11/2002 | Dolan et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,621,892 B1 | 9/2003 | Banister et al. |
| 6,643,034 B1 | 11/2003 | Gordon et al. |
| 6,658,100 B1 | 12/2003 | Lund |
| 6,661,785 B1 | 12/2003 | Zhang et al. |
| 6,662,232 B1 | 12/2003 | Nicholls et al. |
| 6,687,340 B1 | 2/2004 | Goldberg |
| 6,690,785 B1 | 2/2004 | Stelter |
| 6,748,058 B1 | 6/2004 | Schwend et al. |
| 6,751,299 B1 | 6/2004 | Brown et al. |
| 6,782,088 B1 | 8/2004 | Gabara |
| 6,785,021 B1 | 8/2004 | Gordon et al. |
| 6,857,074 B2 | 2/2005 | Bobo, II |
| 6,898,275 B2 | 5/2005 | Dolan et al. |
| 6,968,174 B1 | 11/2005 | Trandal et al. |
| 7,003,087 B2 | 2/2006 | Spencer et al. |
| 7,003,554 B1 | 2/2006 | Turner et al. |
| 7,106,843 B1 | 9/2006 | Gainsboro et al. |
| 7,130,390 B2 | 10/2006 | Abburi |
| 7,231,029 B1 | 6/2007 | Kirkpatrick |
| 7,263,178 B1 | 8/2007 | Brothers et al. |
| 7,363,384 B2 | 4/2008 | Chetani et al. |
| 7,688,958 B2 | 3/2010 | Dolan et al. |
| 8,000,455 B1 | 8/2011 | Van Haaften et al. |
| 8,081,740 B2 | 12/2011 | Reynolds et al. |
| 2001/0004741 A1 | 6/2001 | Sogo |
| 2002/0002704 A1 | 1/2002 | Davis et al. |
| 2002/0010616 A1 | 1/2002 | Itzaki |
| 2002/0097710 A1 | 7/2002 | Burg |
| 2003/0021403 A1 | 1/2003 | Jones |
| 2003/0063731 A1 | 4/2003 | Woodring |
| 2003/0066065 A1 | 4/2003 | Larkin |
| 2003/0123629 A1 | 7/2003 | Hussain et al. |
| 2003/0156700 A1 | 8/2003 | Brown et al. |
| 2003/0167373 A1 | 9/2003 | Winters et al. |
| 2004/0010786 A1 | 1/2004 | Cool et al. |
| 2004/0028203 A1 | 2/2004 | Wurster et al. |
| 2004/0120478 A1 | 6/2004 | Reynolds et al. |
| 2004/0141598 A1 | 7/2004 | Moss et al. |
| 2004/0143628 A1 | 7/2004 | Bradford et al. |
| 2004/0153538 A1 | 8/2004 | Champlin |
| 2004/0190706 A1 | 9/2004 | Fleischer, III et al. |
| 2004/0218743 A1 | 11/2004 | Hussain et al. |
| 2004/0237078 A1 | 11/2004 | Weiss et al. |
| 2004/0258220 A1 | 12/2004 | Levine et al. |
| 2005/0044280 A1 | 2/2005 | Reisman |
| 2005/0053216 A1 | 3/2005 | Spencer et al. |
| 2005/0123118 A1 | 6/2005 | Terry et al. |
| 2005/0166246 A1 | 7/2005 | Calmels et al. |
| 2005/0207556 A1 | 9/2005 | Gonzalez et al. |
| 2005/0210459 A1 | 9/2005 | Henderson et al. |

(56) References Cited

U.S. PATENT DOCUMENTS

| | | |
|---|---|---|
| 2005/0265322 A1 | 12/2005 | Hester |
| 2006/0013374 A1 | 1/2006 | Fleischer, III et al. |
| 2006/0080656 A1 | 4/2006 | Cain et al. |
| 2006/0130045 A1 | 6/2006 | Wesley et al. |
| 2006/0239429 A1 | 10/2006 | Koch et al. |
| 2008/0219424 A1 | 9/2008 | Moss et al. |
| 2009/0052647 A1 | 2/2009 | Wood et al. |
| 2010/0202601 A1 | 8/2010 | Frank |

FOREIGN PATENT DOCUMENTS

| | | |
|---|---|---|
| EP | 1 213 647 A1 | 6/2002 |
| EP | 1 282 036 A2 | 2/2003 |
| JP | 10-513632 | 12/1998 |
| JP | 11-506292 | 6/1999 |
| JP | 2001-168989 | 6/2001 |
| WO | WO 96/18948 | 6/1996 |
| WO | WO 97/26749 | 7/1997 |
| WO | WO 0060840 | 10/2000 |
| WO | WO 01/76210 | 10/2001 |
| WO | WO 03/063533 A2 | 7/2003 |

OTHER PUBLICATIONS

Microsoft® Windows® Server Technical Article; *"Background Intelligent Transfer Service,"* Microsoft Corporation, Published Aug. 2002, pp. 1-18.

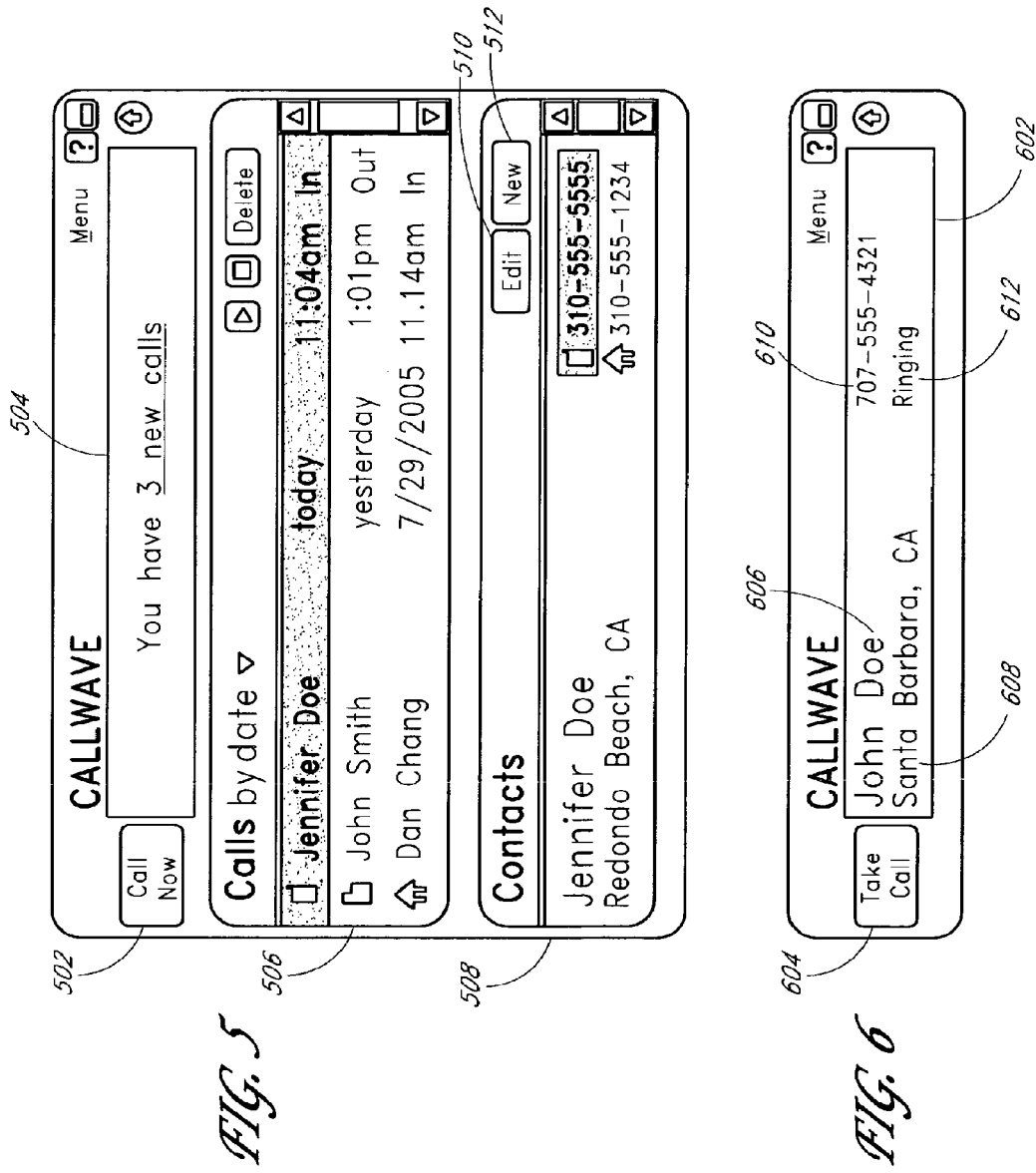

702 — FROM: <Carrier Name> Message Center
704 — SUBJECT: Phone calls for 805-555-4115

Here are the calls for your phone on Saturday, Febuary 2, 2006:

708 — {
from Jennifer Doe (310-555-5555) at 11:04am
to John Smith (775-555-0011) at 1:01pm
from 805-555-2222 at 5:30pm To unsubscribe from this call notification service, click here

FIG. 7

METHODS AND SYSTEMS FOR CREATING A DYNAMIC CALL LOG AND CONTACT RECORDS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

1. Field of the Invention

The present invention is related to telecommunications, and in particular, to methods and systems for processing and storing call related data.

2. Description of the Related Art

Conventionally, users often maintain electronic address books on their computers, home phone, and/or mobile phones. The address books typically include the names and phone numbers of contacts, and may further include physical addresses, email addresses, and website URLs. However, obtaining and entering the address book information manually can be a tedious and time consuming process. While certain phones equipped with Caller ID allow user's to store caller number in a phone address book, the information stored is often limited to the caller phone number, and often the user has to manually enter the caller name, which is then stored in association with the caller number.

SUMMARY OF THE INVENTION

The present invention is related to telecommunications, and in particular, to methods and systems for processing and storing caller data. For example, certain embodiments can advantageously use a call event trigger to log an inbound call and optionally to at least partly populate an associated contact record in a called party's contact data store. Certain embodiments can advantageously use a call event trigger to log an outbound call and to optionally at least partly populate an associated contact record in a calling party's contact data store. Several example embodiments are described below, however the present invention is not limited to such embodiments.

An example embodiment provides a method of processing call information, the method comprising: receiving a first message from a switch at a call processing system when the switch is processing a call from a calling party directed to called party, wherein the first message is initiated at least partly in response to a firing of a call event trigger configured within a switch, the first message including call information, including at least the calling party's phone number and an identifier associated with the called party; storing at least the calling party's phone number in the call processing system; and transmitting over a network a second message from the call processing system to a networked computer associated with the called party, the second message including information related to the call.

Another example embodiment provides method of processing call information, the method comprising: receiving a first message from a switch at a call processing system when a first party originates a call directed to a second party, wherein the first message is initiated in response to at least a first call event trigger, the first message including call information including at least the first party's phone number and the second party's phone number; storing at least a portion of the call information, including an identifier associated with the first party and the second party's phone number, in the call processing system; and transmitting a second message over a network to a networked computer associated with the first party, the second message including information related to the call.

Still another example embodiment provides a method of processing call information, the method comprising: receiving a first message from a switch at a processing system wherein the first message is initiated at least partly in response to at least the firing of a first call event trigger configured within the switch, wherein the first trigger fired in response to a call event associated with a first call from a calling party to a called party, the first message including call signaling related information, the call signaling related information including at least an identifier associated with the calling party and an identifier associated with a called party; storing at least a portion of the call signaling related information in the processing system; and transmitting over a network a second message including call related data from the processing system to one or more networked computers, wherein at least a first of the networked computers is associated with the calling party or the called party.

Yet another example embodiment provides a method of processing call signaling information, the method comprising: receiving a first message from a switch at a processing system wherein the message is initiated at least partly in response to activation of a first call event trigger configured within a switch, wherein the first message includes call signaling data for a first call, the first message including the calling party's phone number and/or the called party's phone number; automatically collecting additional contact information for the calling party and/or the called party; storing at least a portion of the call signaling information and at least a portion of the additional contact data in the processing system; and transmitting a second message to one or more of the networked computers, the second message including information related to the first call.

Another example embodiment provides a method of processing call information, the method comprising: receiving a first message from a switch at a call processing system when the switch is processing a call from a calling party directed to called party, wherein the first message is initiated at least partly in response to a firing of a call event trigger, the first message including call information, including at least the calling party's phone number, an identifier associated with the called party, and an indicator as to whether the calling party's phone number is private; transmitting over a network a second message from the call processing system to a networked computer associated with the called party, the second message including at least a portion of the call information, including the calling party's phone number if the number is not private, wherein the calling party's phone is intended to be displayed on the networked computer associated with the called party if the number is not private.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIG. 5 illustrates a first example user interface.

FIG. 6 illustrates a second example user interface.

FIG. 7 illustrates an example call notification communication.

DETAILED DESCRIPTION OF PREFERRED EMBODIMENTS

Figure 1:
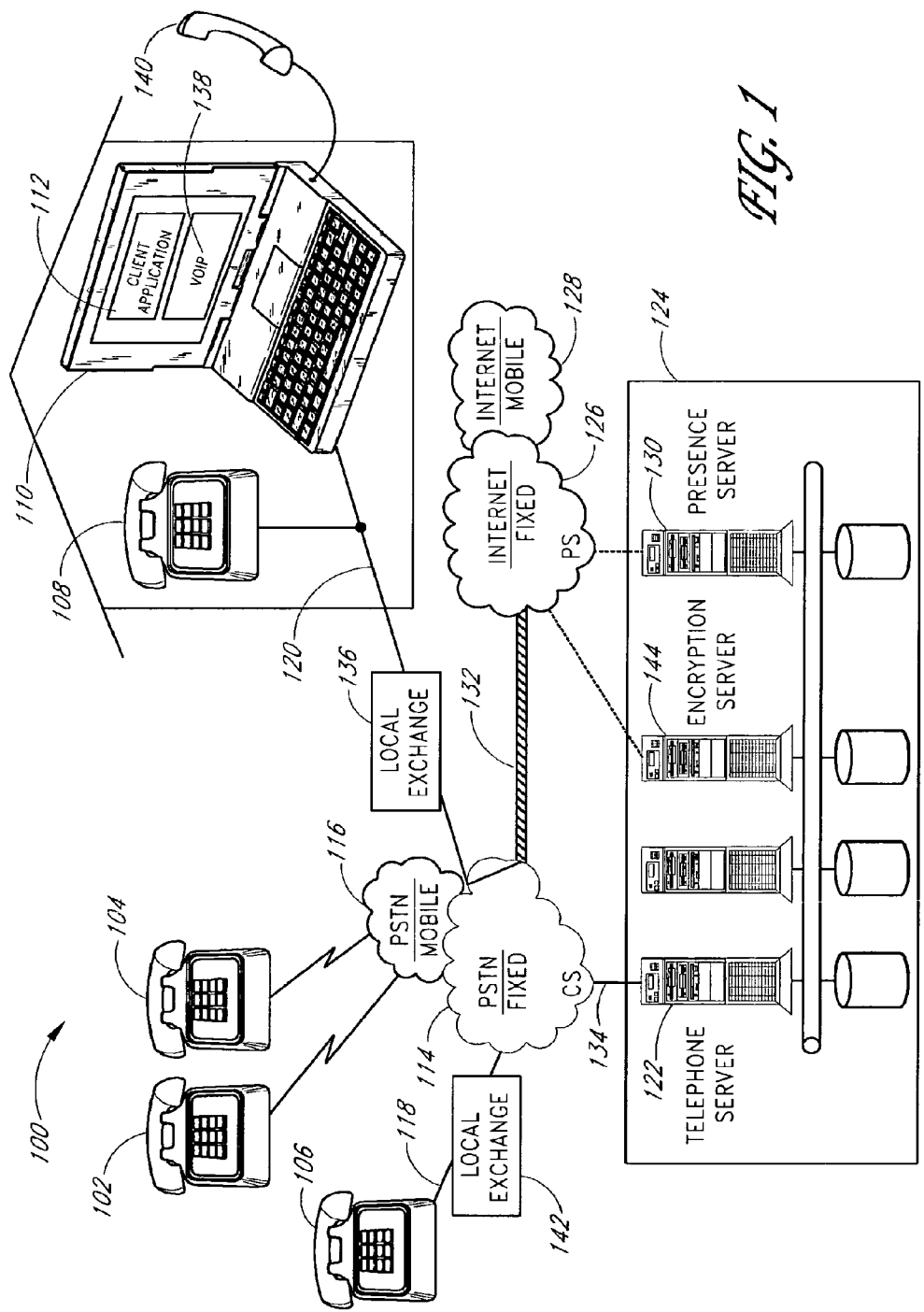
FIG. 1 illustrates an example telecommunications system in accordance with one embodiment of the present invention.

The present invention is related to telecommunications, and in particular, to methods and systems for processing and storing caller data. For example, certain embodiments can advantageously use an AIN trigger to log an inbound call and to auto-create an associated contact record in the called party's contact data store. Certain embodiments auto-create an associated contact record in the called party's contact data store for outbound calls using an AIN trigger.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In addition, a communications line is referred to as "busy" when the communication line is being utilized in such a way that a conventional incoming call will not be connected to the communications line. Thus, for example, if a user is utilizing a conventional line capable of only conducting one of a conventional voice session and a data session at a time for a data session, the line will be busy.

Further, while the following description refers to example network and telephony standards and protocols, other standards and protocols can be used as well. In addition, while references may be made to electronic address books or contact lists, other data stores and formats can be used to store contact information. While certain intelligent network triggers are referred to herein, other triggers or events can be used as well. In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system, other computer or electronic systems can be used as well, such as, without limitation, an interactive television, a networked-enabled personal digital assistant (PDA), a networked game console, a networked entertainment device, and so on. While certain references are made to certain example system components or services, other components and services can be used as well. In addition, while certain user inputs are described as being provided via phone key presses or by clicking on a button, optionally, user inputs can be provides using other techniques, such as by voice or otherwise. While certain phone numbers are referenced for purposes of illustration, other phone numbers or electronic addresses or locators can be used as well.

One embodiment provides methods and systems for a "return-call" process. In contrast to many conventional telephony systems, the return call process in accordance with the present invention enables a missed call to be returned to a "private" phone number without revealing the private number.

By way of example, a user may not be able to take an incoming call because the user's line is busy, the user is not home, or because the user does not want to be disturbed. To better manage such calls, the user's telephone line can be provisioned through the local phone company to forward incoming calls to a call manager system. The call manager system receives signaling information corresponding to the forwarded call. The signaling information includes the calling party's phone number even if the calling party's number is private.

The call manager system transmits a communication, including the caller phone number and a call-received notification, over a computer network to a computer terminal associated with the user. The notification is displayed on the user's computer terminal and informs the user that a call was received from the caller. If the caller phone number is public, the number is displayed as well. However, if the caller's phone number is private, the caller's number is not displayed to the user but is stored in the user's computer terminal memory for later use in returning the call. Upon receipt of the notification, the user can elect to return the call. In response to a user command, the computer terminal initiates the call using the stored caller phone number, still without displaying the phone number to the user.

Alternatively, rather than including the caller's private phone number in the communication to the user, the communication only includes a notification that a call was received. If the user elects to return the call, the call manager performs a call bridging operation without revealing the caller's private phone number to the user. This approach ensures that the user's phone bill will not include the caller's phone number. Further, because the phone number is not provided to the user, the user cannot improperly derive the caller's phone number from the call manager communication.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In addition, unless otherwise indicated, the functions described herein are preferably performed by executable code and instructions running on one or more general-purpose computers. In addition, a communications line is referred to as "busy" when the communication line is being utilized in such a way that a conventional incoming call will not be connected to the communications line. Thus, for example, if a user is utilizing a conventional line capable of only conducting one of a conventional voice session and a data session at a time for a data session, the line will be busy.

FIG. 1 illustrates an example telecommunications system 100 that can be used in accordance with the present invention. As illustrated, the telecommunications system 100 includes a plurality of user telephone stations. The telephone stations can be wired, such as stations 106, 108. However, the present invention is not limited to use with wireline phones. For example, the present invention can be used with wireless stations, such as stations 102, 104. The wired stations 106, 108 are connected via telephone lines 118, 120 to a PSTN 114 configured to process calls from fixed or standard telephone stations. The wired stations 106, 108 can be conventional POTS (Plain Old Telephone System) telephones.

The telephone lines 118, 120 may be shared with one or more computer terminals 110, facsimile machines or the like. The computer terminal 110 can be a personal computer having a monitor, keyboard, a disk drive, and a modem, such as a standard V.90 56K dial-up modem. The modem can optionally be configured to dial-up a number under control of an application, such as a contact manager application or telecommunications client application phone dialer, stored and executing on the computer terminal 110. In addition, the computer terminal 110 can be an interactive television, a networked-enabled personal digital assistant (PDA) or the like. Optionally residing and executing on the computer terminal 110 is a telecommunications client application 112. The telecommunications client application 112 is used to provide enhanced communication services, as discussed in greater detail below. The telecommunications client application 112 is connected to and communicates with a call manager system 124 via the Internet 126, an intranet, or the like. The telephone lines 118, 120 can be used to establish a dial-up connection for computer terminals, such as terminal 110 via the modem, to an Internet Service Provider (ISP).

In addition, the computer terminal 110 can be equipped with VoIP (Voice over Internet Protocol) software 138 and a handset 140, including a microphone and speaker, allowing voice communications to be conducted over the Internet 126 using Internet Protocol. VoIP communicates data via packet switching, which opens a connection just long enough to send a packet of data, including digitized voice data. In particular, the computer terminal 110 divides the voice data into small packets. Each packet includes a destination address informing the network where to send the packet. If the receiving station is also a VoIP terminal, then when the receiving terminal receives the packets, VoIP software executing on the receiving terminal reassembles the packets into the original data stream. The data stream is then converted to a voice signal. If the receiving station is a conventional telephone, then a VoIP gateway converts the packets into a voice signal which is then connected to the conventional telephone.

In one embodiment, the VoIP process is performed using the H.323 standardized protocol established by the International Telecommunications Union (ITU). Advantageously, H.323 provides specifications for real-time, interactive videoconferencing, data sharing and audio applications such as IP telephony. Alternatively, the Session Initiation Protocol (SIP), established by the Internet Engineering Task Force (IETF), can be used. SIP is generally more efficient than the H.323 protocol as SIP is specifically intended for IP telephony. Other current and further protocols can be used as well.

In particular, the telephone stations 106, 108 and/or computer terminal 110 are coupled via the fixed PSTN 114 to corresponding local exchange switches 136, 142, used to connect and route calls, and to and from local exchange switches and remote exchanges via tandem switching offices (the fixed PSTN). The telephone stations are connected to a telephone server system 122 in the call manager system 124, coupled to the fixed PSTN 114 through a trunk system 134. Thus, advantageously the call manager system 124 does not have to be coupled to the same local exchange as the calling or called terminal. Indeed, the call manager system 124 can be located in a different country than the called and calling parties and does not have to be positioned between the local exchange switch and the calling station.

Figure 4:
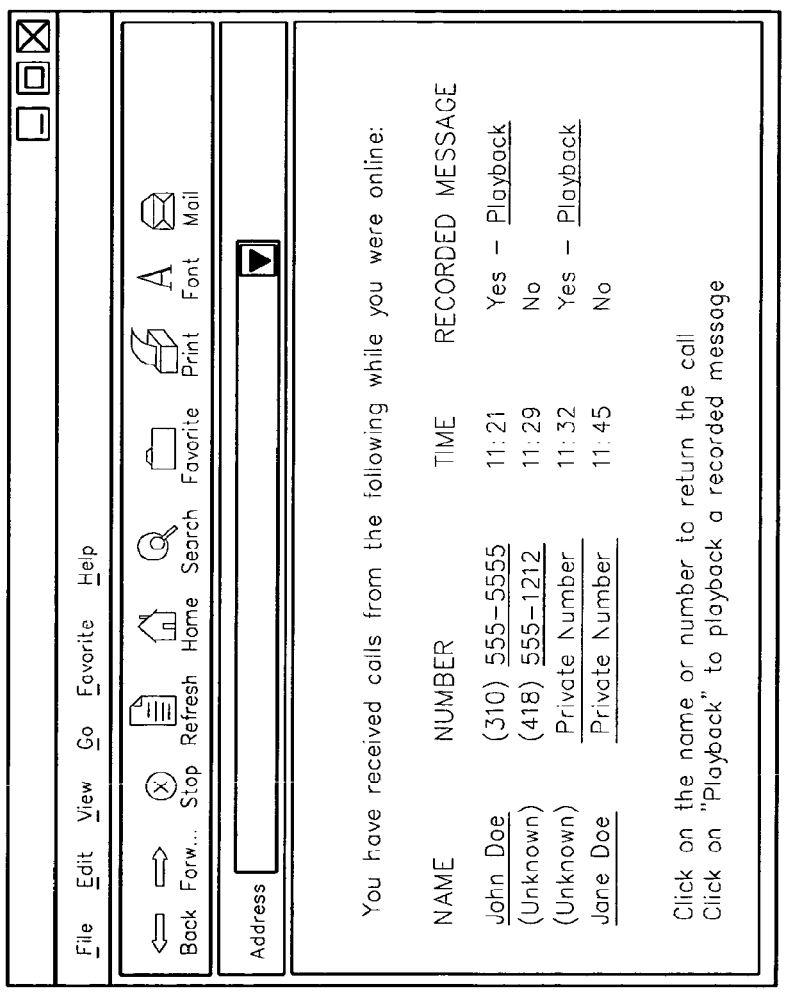
FIG. 4 illustrates an example return-call notification.

The call manager system 124 optionally hosts a Web site used by subscribers of the call manager system 124 to setup and manage their accounts and to view a return call web page, such as that illustrated in FIG. 4. Other embodiments of the call manager system 122 are described in U.S. patent application Ser. No. 09/539,375, filed Mar. 31, 2000, now U.S. Pat. No. 6,477,246, the contents of which are incorporated herein in their entirety by reference. The call manager system 122 is optionally configured as, or to appear as, a telephone central office and can interface with the PSTNs 114, 116 as a Class 5 switch.

The telephone trunk system 134 has associated signaling channels. The present invention is not limited to a particular signaling convention. For example, as illustrated, the present invention can be utilized with a Common Channel Signaling system, such as Signaling System 7 (SS7), having separate voice/user data and signaling channels. In addition, the present invention can be used with other signaling methods, such as ISDN, Advanced Intelligent Network (AIN), and/or inband signaling. The selected signaling system provides caller identification, wherein the caller's telephone number is provided to the called party. Thus, for example, ANI (Automatic Number Identification) information is provided, wherein the caller's local telephone company transmits the calling or billing telephone number along with the call.

The wireless stations 102, 104 are coupled to a PSTN 116, configured to handle mobile, wireless stations via wireless communications towers configured to broadcast and receive cellular radio frequency communications. The wireless towers can be, for example, CDMA or GSM cellular mobile base stations. The PSTN 116, in turn, is connected to the call manager system 124 via the trunk system 134. The call manager system 124 can communicate via the Internet mobile 128 with other Internet capable devices, including wireless stations 102, 104, configured to receive Internet communications, including, but not limited to, text messages.

When a user attempts to place a call via station 102 to station 108, the call is routed through a mobile base station system to the PSTNs 114, 116. If the line 120 for station 108 is busy, not answered or has a do-not-disturb indication, the PSTN 114 forwards the call to a local or toll-free number associated with the call manager system 124. The call manager 124 then processes the call as described in greater detail below.

The call manager system 124 manages communications with the telecommunications client application 112 and with forwarded calls. The call manager can interact with callers and called parties through voice prompts, voice commands, and dtmf touch-tone entries. The call manager system 124 can be configured to perform additional functions, such as acting as a telephone answering system that answers call, plays outgoing messages, records incoming messages, and bridges calls.

One such Internet answering system is operated by Call-Wave, Inc. As is well known in the field of Internet telecommunications, CallWave, Inc. provides an Internet answering service that works with the "Call Forward On Busy" feature of a standard phone line to answer calls while the subscriber is online and is using the phone line to access the Internet. Once activated, callers no longer get annoying busy signals when the subscriber is online. Instead, callers hear a brief greeting after which they can leave a short message. The recording can be streamed in substantially real-time or sent within seconds after recording has completed to the subscriber over the Internet.

The call manager system 124 is connected to the Internet 126, 128 as a computer host. As previously discussed, the call manager system 124 can also host a Web site used to manage subscriber accounts and to provide a call return interface. When a user or subscriber connects to the Internet using, for example, a dial-up ISP, the telecommunications client application 112 executing on the subscriber's computer terminal can make the subscriber's online presence known to the call manager system 124. In particular, the call manager system 124 includes a presence detection system 130 that communicates with the telecommunications client application 112 executing on the computer terminal 110 to determine whether the computer 110 is online. Presence detection can be performed by the presence detection system 130 polling or pinging the computer terminal 110 via the telecommunications client application 112, or by the telecommunications client application transmitting an "I'm alive" message and subsequent periodic "keep alive" messages to the presence detection system 130. The client application 112 is optional, and is not needed in some embodiments. The call manager system 124 further includes an encryption server 144, which is described in greater detail below.

A user can access a data network, such as the Internet 126, by establishing a telephone dial-up connection to an ISP. The Internet 126 is coupled to the PSTNs 114, 116, via a trunk or backbone system 132. Text, graphic and voice communications can be communicated between the call manager system 122 and the computer terminal 110. For example, communications are transmitted from the call manager system 122 over the PSTN 114, via the trunk system 132 to the computer terminal 110 via the Internet 126. Similarly, communications are transmitted from the computer terminal 110, over the Internet 126, through trunk system 132 to the to the telephone and presence servers 122, 130. The user is preferably a registered subscriber to the call manager system 124.

Figure 2:
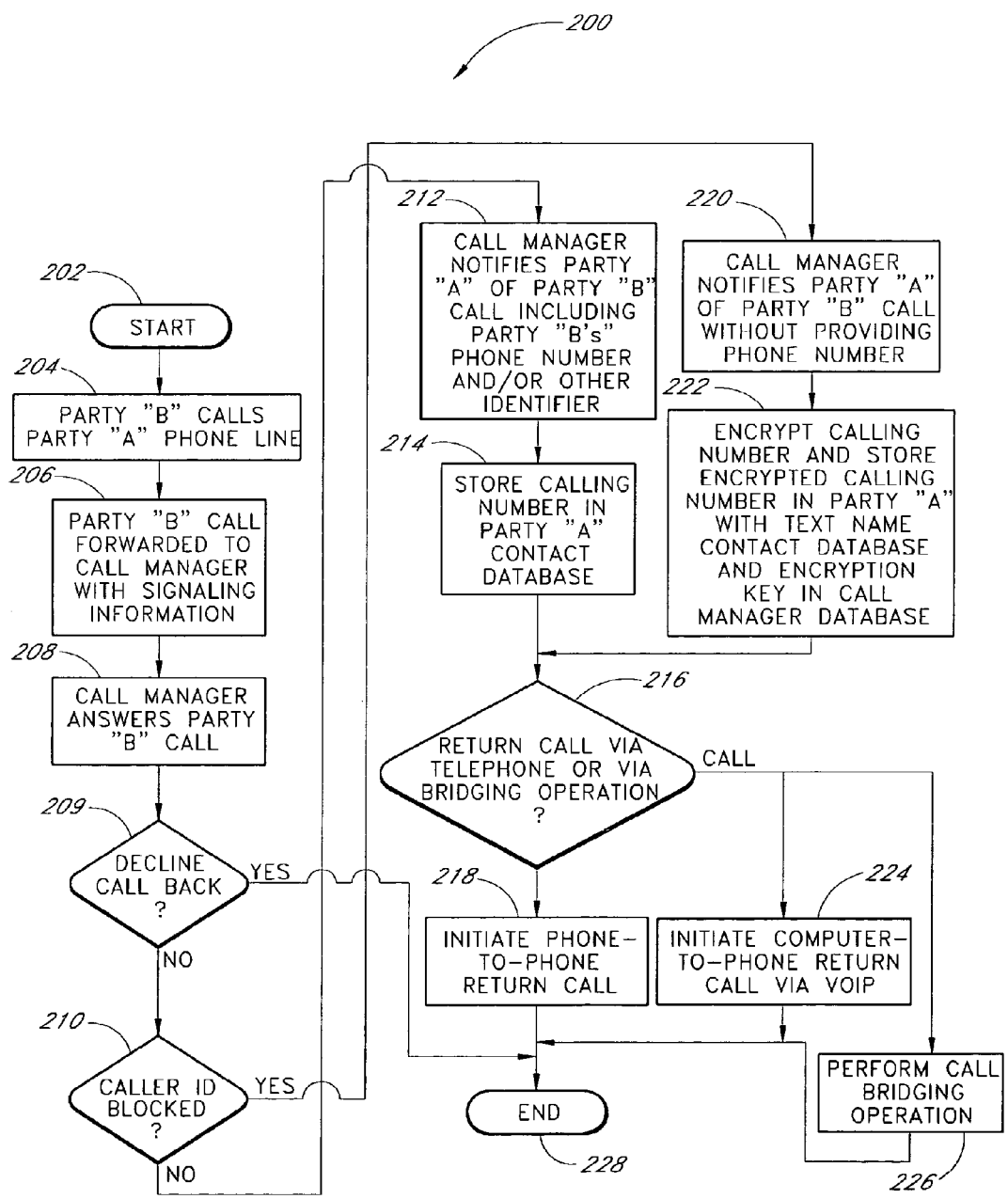
FIG. 2 illustrates an example return-call process in accordance with the present invention.

The example telecommunications system illustrated in FIG. 1 can be used with one embodiment of the return-call process in accordance with the present invention. FIG. 2 illustrates an example return-call process 200, wherein a called party, referred to as Party A, misses a call from a calling party, referred to as Party B, and then returns Party B's call. It is assumed for the purposes of this example that the called party's line is provisioned with "Call Forward On Busy," call forward on "Ring-No-Answer", and/or call forward when the user has activated a "do-not-disturb" feature.

Beginning at start state 202, the process 200 proceeds to state 204. At state 204, Party B calls Party A's phone line using, by way of example, the wired station 106 illustrated in FIG. 1. At state 210, Party B's call is forwarded to the call manager system 124 over the PSTN, such as PSTN 114, along with signaling information. The signaling information includes Party B's phone number via ANI (Automatic Number Identification). Because Party B's call is being forwarded to the call manager system, the call manager system infers that Party's line is busy or that Party A is otherwise not available to take the call. Further, because the call manager is configured as a central telephone office and receives SS7 signaling information, even if Party B has caller-ID blocking on, so that Party B's telephone number is designated as "private," the call manager receives Party B's telephone number. The "private" designation is provided by a presentation indicator associated with each call that designates the calling party as private or public.

In one embodiment, Party A's line is configured so that calls are forwarded over the PSTN to either a local telephone number or a toll-free number associated with the call manager system when Party A's line is busy. The toll-free number may be an "800" or "888" number, by way of example. Because Party B's call is being forwarded to a toll-free number, even if Party B has caller-ID blocking on, and even if the call manager system is not configured as a central office, the calling number is transmitted to the call manager system. Optionally, the caller can call a phone number (e.g., a "virtual" phone number) associated with the caller and assigned to call processing system rather than having the caller's call forwarded to the call processing system.

At state 208, the call manager system answers Party B's call. Party B is provided the option of recording a voice message on the call manager system for delivery to Party A. At state 209, the call manager can also ask the Party B if Party A is to be notified of the call so that Party A can return the call. In this embodiment, if the caller declines, then no return call notification is provided to Party A, and the process 200 ends. If Party B does want a return call notification provided to Party A, the process 200 proceeds to state 210.

A determination is made at state 210 as to whether Party B's number is "private," with Caller-ID blocking activated. If Party B's number is not "private," it is designated as "public." If Party B's number is public, then at state 212 the call manager transmits a message to Party A's computer terminal notifying Party A that Party B has attempted to call Party A, the message including Party B's phone number. In one embodiment, a telecommunications client application executing on Party A's computer terminal displays the message, including Party B's phone number, on the computer terminal's monitor. Optionally, the call manager waits to receive a presence indication, in the form of a log-on or a "keep alive" communication from the client application before transmitting the message. Alternatively or in addition, Party A can access a "missed calls" page, such as that illustrated in FIG. 4, from a web site operated in association with the call manager. Further, the call manager can email the message to Party A.

Optionally, the call manager can access a reverse number database or a contact database associated with Party A to locate a name or other identifier associated with Party B's phone number. If a corresponding name or other identifier is located, it can be included for display in the message provided to Party A. The contact database can be stored on Party A's terminal or the call manager system.

In addition, if Party B recorded a voice message, that message can be transmitted or streamed to Party A's computer terminal for playback in substantially real-time. At state 214, the telecommunications client application or call manager system inspects Party A's contact database to determine if a record exists for Party B's number. If not, the telecommunications client application or call manager offers to create a contact record for Party B. If Party A agrees to have a contact record created for Party B, the telecommunications client application or call manager automatically populates the contact record with Party B's phone number, and if available, name, and enables Party A to edit or add information to the record. Party A can then instruct that the contact record be saved and closed. Party A can later place calls to Party B using the stored contract information.

If Party B's number is "private," the process 200 proceeds from state 210 to state 220. As discussed above, even if Caller-ID blocking is on, the call manager system still receives Party B's phone number. However, in order to protect the caller's privacy and if needed to comply with federal or other regulations, the call manager system notifies Party A that a call was received, but does not provide for display Party B's phone number unless authorized by the calling party in response to a request from the call manager system. The authorization can be provided through one or more voice prompt interactions. However, if Party B recorded a voice message, the call manager system transmits the voice message to Party A's computer for playback by Party A.

Proceeding to state 222, the telecommunications client application or call manager system inspects Party A's contact database to determine if a record exists for Party B's number. If not, the telecommunications client application or call manager system offers to create a contact record for Party B. If Party A agrees to have a contact record created for Party B, the telecommunications client application or the call manager encryption server 144 illustrated in FIG. 1, automatically encrypts the caller's number with an encryption key so that Party A cannot read the number, and populates the record with Party B's encrypted phone number, and other available, non-private information. The encryption key is stored on a call manager encryption server so that the encrypted number can be later decrypted. Party A can edit or add information to the record. For example, Party A can tag the encrypted number with a text identifier, such as the caller's name, to help Party A be able to later locate and call Party B using the contact database record. Party A can then instruct that the contact record be saved and closed. Party A can later place calls to Party B using the stored contact information.

Alternatively, the private phone number can be stored on the call manager system server and an index or pointer to the phone number is stored on Party A's computer system. When Party A wants to later call Party B, Party A initiates the transfer of the index to the call manager, which then transfers the phone number to Party A's telecommunications client application. The telecommunications client application then initiates a call to Party B without displaying the phone number to Party A. A calling process using the encrypted phone number is described below with reference to FIG. 3.

Proceeding to state 216, Party A can be offered a choice of returning Party B's call using Party A's conventional POTs telephone, via Party A's VoIP-enabled terminal, or by a call bridging operation performed by the call manager. In one example method, if Party B's number is designated as private, Party A may be limited to returning Party B's call by the call bridging operation.

If Party A elects to have the call placed using a conventional telephone, then the process proceeds to state 218, where a call is initiated over Party A's telephone. In particular, the computer modem dials the phone number provided in the call manager message, and the Party A picks up the telephone handset to talk with Party B when Party B answers.

If Party A elects to have the call placed using VoIP, then the process proceeds to state 224, where a call is initiated by Party A's computer terminal. The VoIP software transmits the phone number provided in the call manager message to a VoIP gateway that converts the call data from packets into a form suitable for telephonic communications with the caller's phone, and connects the call via the PSTN to the original caller. The called party can then communicate with the original caller using the computer terminal handset. Using VoIP to return the call avoids having Party B's phone number appear on Party A's phone bill.

If Party A elects to have the call placed using a bridging operation, then the process proceeds to state 226, where a call is bridged between Party A and Party B by the call manager. A notification is sent from Party A's client application, call manager web-site, or other notification device of Party A's desire to return a call to Party B. Included in Party A's request is a unique identifier, such as a database pointer or index, that allows the call manager system to determine Party B's phone number from a database of stored/encrypted numbers. The call manager system first calls Party A's phone number which is specified in Party A's request. The call can be placed, by way of example, as a POTs or VoIP call. Next, the call manager system calls Party B's line and bridges Party A with Party B. Alternatively, the call manager system first calls Party B's phone number, then the call manager system calls Party A's line and bridges Party A with Party B. Other bridging techniques which are well known to those of ordinary skill in the industry, and hence not explained in detail herein, can be used as well. The process ends at state 232. Alternatively, rather than asking Party A to select whether the call is to be placed using the telephone or using VoIP, the telecommunications client application detects if Party A is online. If so, the call is automatically placed using VoIP. If Party A is offline, the call is automatically placed via the telephone, with the computer modem performing the dial-up operation.

If multiple calls to Party A are forwarded to the call manager system, a log is kept of each call. By way of example, the log includes each caller's phone number, the time of the call, and whether the caller recorded a message. This information is then used to generate a missed/return-call notification for Party A, as discussed in greater detail below with respect to FIG. 4.

Figure 3:
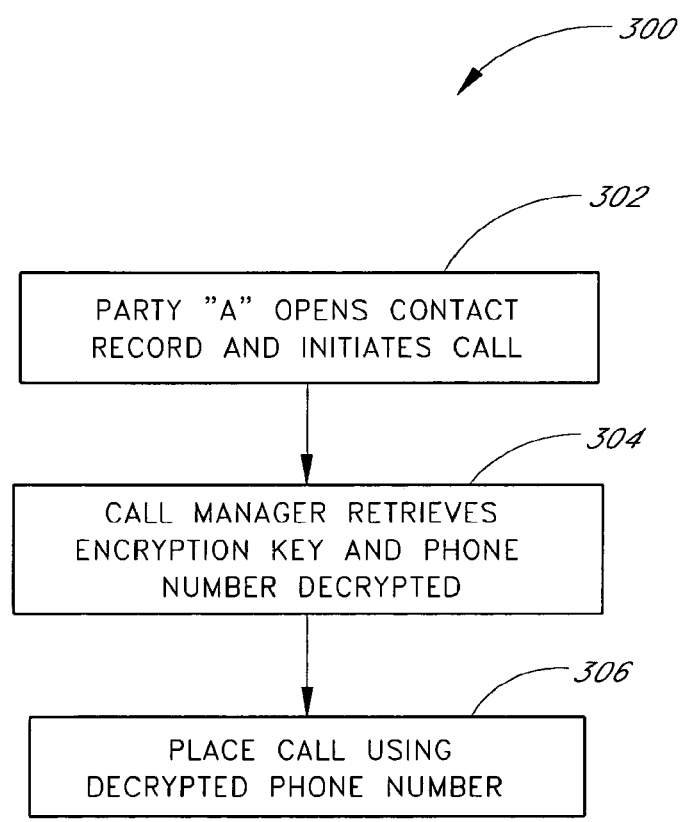
FIG. 3 illustrates an example process for returning a call using an encrypted phone number.

FIG. 3 illustrates an example process 300 for calling a called party whose phone number is stored on the calling party's computer terminal in an encrypted format and hence unknown to the calling party. Beginning at state 302, when Party A wants to place a call to Party B, Party A opens the contact record stored on Party A's computer system, and instructs that a call be placed to Party B. At state 304, the telecommunications client application retrieves the corresponding encryption key from the call manager system and decrypts the phone number. Alternatively, the call manager retrieves the encrypted phone number from the computer system, decrypts the phone number using the encryption key, and transmits the decrypted phone number back to the computer system. At state 306 the call is placed using the decrypted phone number, but without revealing the encrypted phone number to Party A.

In another embodiment, rather than storing Party B's phone number on Party A's computer terminal, the phone number is instead stored on the call manager system and a pointer to the phone number is stored on Party A's computer terminal. When Party A wants to call Party B, the client application passes the number to the call manager system, which then performs a call bridging operation between Party A and Party B. This ensures that Party B's phone will not be displayed on Party A's phone bill.

FIG. 4 illustrates an example missed/return-call notification presented via a browser to a called party. The browser can be executing on a computer terminal, such as a Wireless Application Protocol (WAP)-enabled phone, a PDA or the like. The notification can be accessed by supplying the appropriate URL to the browser and optionally providing log-on information, such as a user name and a password. In addition or alternatively, the missed/return-call notification can also be transmitted to the telecommunications client application discussed above for display on the computer terminal.

The notification lists missed calls, including the caller identity when known, the caller's phone number, when public, the time of the call, and whether the caller left a message. If caller's phone number is "private," then as discussed above, the phone number is not displayed to the called party. Instead, the phrase "Private Number" or the like is displayed. If a contact record has been previously stored in the called party's database, as previously discussed with respect to FIG. 2, then a text message entered in association with the encrypted private number is displayed. In the example illustrated in FIG. 4, the name "Jane Doe" is a text message previously stored by the called party in association with the encrypted private number.

When a called party clicks on the caller's name, phone number, or the phrase "Private Number," a return call is initiated by the called party's computer system as described above with reference to FIGS. 2 and 3. If the called party clicks on or otherwise activates the "playback" link, the message left by the caller will be played back by the computer system to the called party. Alternatively, the messages can be played back by the called party's terminal in substantially real-time as the messages are being recorded so long as the messages do not overlap in time.

In one embodiment, enhanced call management services are provide via Common Channel Signaling (CCS) or Common Channel Interoffice Signaling (CCIS) information, such, by way of example, as via SS7 Intelligent Network (IN) triggers in the switches of local exchange telephone companies.

In an example embodiment, call logging and alerting services are provided using triggers. For example, a phone company configures triggers at the appropriate points in the inbound or outbound calls for a subscriber/customer at an exchange, such as a local exchange. An enhanced service provider, associated with a softswitch and a system acting as a Service Control Point (SCP) in the SS7 network, receives queries from a local exchange (e.g., via a Service Switching Point (SSP)) that enables it to collect information about the call and/or instruct the switch how to handle the call. Optionally, the owner/operator of the softswitch enters into a contractual or other arrangement with the carrier associated with the SSP to set triggers on some or all of lines associated with the SSP.

By way of background, a trigger has an associated firing criteria. When a trigger is made active (armed), and its associated firing criteria is (are) satisfied, the trigger fires. When a trigger fires, in an example embodiment, a message is formatted with call related data and the message is transmitted by the SSP to the SCP. The SCP then reads and/or stores in computer readable memory some or all of this call related data and generates a response which the SSP then uses in further call processing.

As will be described in greater detail below, in an example embodiment, a trigger, such as an AIN Termination Attempt trigger, is used to log an inbound call and to automatically create an associated contact record in a data store associated with the called party. Further, an associated contact record is automatically created in a data store associated with the called party for outbound calls using a trigger, such as an AIN Origination Attempt trigger.

Optionally, when a caller calls a called party, and the called party does not have a contact record in for the caller in the electronic address book, a contact record for the caller is automatically created. Optionally, the record will only be stored permanently (e.g., for an extended period of time) in the called party's electronic address book or other data store associated with the called party, if the called party approves, if the caller has called more than a predetermined number of times, and/or if the called party has accepted a call from the caller more than a predetermined number of times.

An example SS7 network comprises data switching systems (e.g., Signal Transfer Points (STPs)) and data links between the STPs and switches, such as Service Switching Points (SSPs). In one example embodiment, an STP is a processor-based, program controlled packet data switching system. An STP receives a packet data message, including point code information, from another network node, such as an SSP. The STP reads the point code information routes the packet in accordance with a static translation table. A packet is output on a port going to the node specified by translation of the packet point code.

The network optionally includes a central database and high level control nodes, (e.g., Service Control Points (SCPs)) used to enable the network to be an Advanced Intelligent Network (AIN). The network also optionally includes data links connecting the SCPs to one or more STPs.

In an example AIN, a public telephone switch detects call processing events, referred to as triggers, which cause corresponding call processing. When a trigger is detected, call processing may be suspended, a call data message may be compiled and forwarded via the signaling network to an SCP. The SCP may include a Multi-Services Application Platform (MSAP) database. The SCP can instruct a carrier office, such as the central or local PSTN office, to obtain and forward additional information if appropriate. Once sufficient or appropriate call information is received by the SCP, the SCP accesses MSAP database tables to translate the received message data into a call control message and returns the call control message to the PSTN office which uses call control message to complete the call.

Figure 4A:
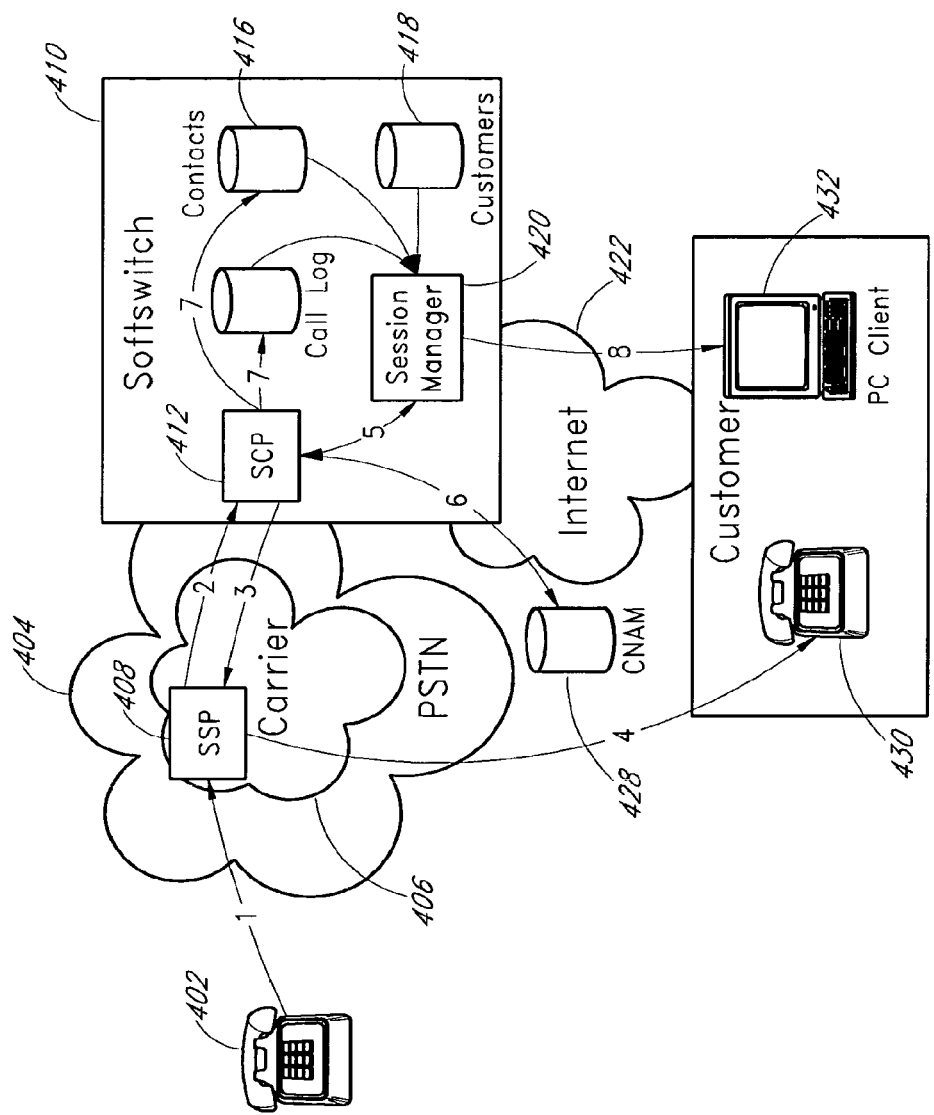
FIG. 4A illustrates an example operating environment and example call processing.

Still other example embodiments can be used to create contact records and/or generate call logs. FIG. 4A illustrates example systems and processes for processing call signaling information, generating call logs, and creating contact records using triggers, such as intelligent network triggers.

A processing system, such as, by way of example, call processing system 410 (which can optionally correspond in whole or in part to the call manager system discussed above), also referred to herein as a softswitch, is coupled to the PSTN 404 via a PSTN carrier 406, and in particular, to a remote carrier SSP 408. The SSP 408, in turn, is coupled to one or more phone terminals 402, 430 (e.g., POTs phones, wireless cellular phones, VoIP phones, or other telecommunication terminals). The call processing system 410 is also optionally coupled to a data network, such as the Internet 422, a cable television network, an intranet, or other network, and to one or more client terminals (e.g., personal computer, smart phone, PDA, interactive television, etc.) associated with a user of one or more phone terminals, such as terminal 430. The client terminals can have a telecommunications client executing thereon, as similarly described above, such as with respect to client 112.

In particular, the call processing system 410 includes an SS7 interface to a PSTN switch via which the call processing system 410 can monitor inbound and outbound telephone and/or fax calls. The call processing system 410 also includes a data network interface, such as an interface to the Internet, to manage communications with online client devices 432, such as Internet Protocol clients hosted on subscriber processor based systems, and other call processing, network, and third party systems, such as servers. Optionally, the call processing system interconnects with the switch across an intranet or the Internet via a gateway that converts SS7 traffic to an Internet Protocol.

The call processing system 410 optionally includes an online presence detection Internet Session Manager subsystem 420, which monitors subscriber online presence, via one or more clients associated with the subscriber, and account status. The call processing system 410 optionally includes a call processing system Database (DB) subsystem, including a contact database 416, a call log database 414, and a customer account database 418, in which some or all of the following is stored: called party/subscriber call processing system service parameters (e.g., message recording enabled/disabled, inbound call logging enabled/disabled, outbound call logging enabled/disabled, call log transmission to SMS address enabled/disabled, call log transmission to email address enabled/disabled, call log transmission to IM address enabled/disabled); call information (e.g., the customer's phone numbers/addresses and an identification of the corresponding terminals, such as home, work, mobile, VoIP); call alert/log and notification destination addresses (e.g., SMS addresses, instant messaging addresses, email addresses, etc.); passwords; user identifiers; call handling instructions (e.g., forward all calls to a specified phone number/address, forward calls from a specified set of callers to a specified number/address, direct all calls to voice answering and recording, direct all from a specified set of callers to voice answering and recording, etc.), and/or contacts.

One or more of the foregoing subsystems can be hosted on the same computer system (e.g., a network server), or one or more subsystems can be hosted on separate corresponding computer systems. If the foregoing subsystems are hosted on different computers, they are optionally interconnected via a wired or wireless Local Area Network (LAN), a Wide Area Network (WAN), and/or other network.

The contact database 416 can store contact records, such as in the form of contact lists/address books, associated with customers or other users in computer readable memory. By way of example, a contact list/address book record can include some or all of the following information for a contact: a contact name, nickname, photograph, title, work phone numbers, fax numbers, home phone numbers, mobile phone numbers, work addresses, home addresses, work email addresses, home email addresses, instant messaging addresses, SMS addresses, company name, contact category (e.g., personal, business, restaurants, airlines, etc.), names of the contact's family members, birthday/anniversary date information for the contact and/or family members of the contact, a description of favorite/preferred types of music/wine/flower, the number of calls received from the contact (optionally, the total number of calls from a certain date or in a specified time period, and/or the number of calls from each phone number associated with the contact), the number of calls from user to the contact (optionally, total number of calls placed by the caller from the caller's phone to the user, and the number of calls to each phone number associated with the contact), etc. A user's contact list/address book includes an identifier associated with the user (e.g., a user name, account number, or other identifier).

Optionally, instead or in addition, the contact list/address book can be stored on a terminal (e.g., a personal computer, smart phone, etc.) associated with the user. For example, the contact/address book can be a Microsoft Outlook® address book stored on a Microsoft Windows computer, an Apple address book stored on a computer running OS X, or other personal information manager address book.

The call log database 414 can store logs of calls placed to and/or placed by a given user. For example, the call log can include for a given call some or all of the following information: a name of the other call participant(s), the date the call was placed (e.g., today, yesterday, 3/1/06), and indication as to whether the call was an inbound call (directed to the user), or an outbound call (placed by the user to another call participant), the number of calls placed from or to a given phone number/address involved in the call, the number of calls placed by the other participant involved in the call or received from the other participant, an indication as to how the call was handled (answered, busy, forwarded to voice mail, refused, forwarded to another number, etc.), the length of the call if the call was completed, etc.

While FIG. 4A illustrates an example call processing system 410 that utilizes the PSTN 404 to perform call logging and contact creation, the call logging and contact creation process can optionally be provided using an Internet Telephony infrastructure instead of or in addition to using the Public Switched Telephone Network, conventional SSPs, and SS7 AIN triggers. Internet protocol telephony, such as VoIP (voice over Internet protocol), may use, in whole or in part, the Session Initiation Protocol (SIP) as the signaling protocol. SIP is a standardized signaling protocol which can be used for Internet conferencing, telephony, presence, events notification and instant messaging. The Session Initiation Protocol is currently an Internet Engineering Task Force (IETF) standard protocol, although non-standard, future, and/or different protocols can be used as well. There may be several versions and implementations of SIP. SIP, by way of example, enables one or more of the following services to be provided, using proxy servers and end user client systems:

A call may be routed partially over the Internet, using SIP, and partially over a circuit-switched network, such as a PSTN (public switched telephone network). The PSTN may utilize a variety of signaling and other standards, such as the SS7 signaling protocol.

SIP is a request-response protocol. In one embodiment, SIP can be used for establishing, manipulating and tearing down user sessions, wherein several users can optionally participate in a session. A session can optionally involve multimedia elements including audio, video, instant messaging, and/or other real-time data communications. By way of further example, a session can be an Internet multimedia conference, an Internet telephone call and/or a multimedia distribution session. Optionally, session members can communicate using multicast and/or using a mesh of unicast relations.

SIP can optionally run over UDP (User Datagram Protocol), TCP, IP, ATM, X.25 and/or other protocols. In one embodiment, SIP can work in the Application layer of the Open Systems Interconnection (OSI) communications model.

SIP invitations are optionally used to create sessions. The invitation can carry session descriptions which enable participants to agree on a set of compatible media types. SIP enables user mobility by providing proxy services and redirecting requests to the user's current location. For example, users can register their current location so that calls can be directed to a telephone or other terminal corresponding to the location.

An example system that can be used to support SIP can include some or all of the following components:

1. An endpoint component, sometimes referred to as a user agent (UA), which can be a hardware and/or software device implementing or compatible with SIP, such as an Internet Protocol (IP) phone or other terminal. The endpoint components can include a client used to initiate calls and a server used to answer calls. By way of further example, a SIP Proxy, a SIP phone, a call processing system, and so on, can be SIP endpoints.

2. A SIP network server that handles signaling associated with one or more calls. By way of example, in an optional embodiment, the network server provides name resolution and user location. The SIP network server can include one or more additional servers. For example, the SIP server can include a Register server used to receive registration messages from endpoints regarding current user location. Using a mapping database, the Register server can map the SIP addresses with the physical location or locations in the domain where the endpoint is located. The SIP network server can also include a proxy system that transmits call setup and tear down information and optionally forwards SIP messages to multiple proxy servers, creating a search tree, in order for the SIP messages to reach their destination. In addition, a SIP proxy can discover endpoint characteristics of an endpoint by consulting a list of registration templates, including dynamic configuration parameters, for that endpoint. The network server can also include a SIP Redirect server that enables endpoints to locate a desired address by redirecting one or more of the endpoint to another server.

SIP addresses can be the form of uniform resource locators (URL). By way of example, SIP addresses can optionally be embedded in Web pages. In certain applications, a user can click on a SIP address embedded in a Web or other electronic document, and in response, a call can be placed from the user terminal to the SIP address, and the user can then talk to the person or system associated with the SIP address and/or send data files to the person or system associated with the SIP address.

When making a SIP call using a SIP terminal, the SIP terminal locates the appropriate server and then sends a SIP request, such as an invitation that initiates a session. The request may directly reach the intended call recipient, or the request may be redirected or may trigger a chain of new SIP requests by proxies. If a call is to be routed through a number of different proxy servers, a redirect server can be used. When a caller's user agent sends an INVITE request to the redirect server, the redirect server contacts the location server to determine the path to the called party, and then the redirect server sends that information back to the caller. The caller terminal then acknowledges receipt of the information. The caller terminal then sends a request to the device indicated in the redirection information (which could be the call recipient terminal or another server that will forward the request). Once the request reaches the call recipient terminal, the recipient terminal transmits a response and the caller acknowledges the response.

The Real Time Protocol (RTP), Real Time Control Protocol (RTCP), and/or other appropriate protocols can be used to send audio using packets over the Internet to allow the caller and call recipient to verbally communicate. By way of example, the packets can optionally be UDP packets.

FIG. 4A illustrates an example scenario in which a caller initiates a call to a phone number/address assigned to the carrier's (e.g., telephone company's) customer (e.g., a direct or indirect subscriber). The carrier has optionally configured this phone number/address with one or more IN triggers that fire during inbound and outbound calls. Optionally, the SSP 408 can be configured to fire an appropriate trigger at the appropriate call state for all calls being handled by the SSP 408.

Optionally, instead, triggers are specifically set for a subset of subscribers, such as subscribers of enhanced call processing services (e.g., those provided by an entity other than the telephone company/carrier, or those provided by the telephone company/carrier to a subset of its subscribers). Thus, for example, potentially one subset of calls direct to a first set of phone numbers/addresses will cause one or more triggers to be fired, while another subset of calls directed to a second set of phone numbers/addresses will not. Optionally, the firing of one or more triggers will cause a query to be transmitted to a call processing system, such as call processing system 410, which is optionally operated by a third party that provides enhanced call processing services. An example call handling sequence is as follows:

1. At state 1, a caller initiates a call to a called party by entering (e.g., dialing, or selecting from a call log or contact list) a phone number or other terminal address associated with the called party. The call is routed through the PSTN 404 to the carrier switch (SSP 408) serving that called party's phone line, and the call is temporarily suspended. The caller may or may not be a subscriber to the services offered by the call processing system 410.

2. In this example, the SSP 408 has triggers set on the lines of subscribers of enhanced call processing services, and the called party is a subscriber/customer of such services and has account information stored in the call processing system customer database 418. In this example, a Termination Attempt trigger (TAT) trigger is set on the subscriber's line, although other triggers can be used. At state 2, the TAT trigger fires causing a TCAP (Transaction Capabilities Application Part) query to the configured SCP point code, which in this example is SCP 412. The TCAP query includes the called party and/or calling party phone numbers/address and optionally, an indication as to whether the calling party's phone number is private/restricted. Optionally instead or in addition to the called party phone number/address, another called party identifier, such as an account number or a UserID, can be included in the TCAP query.

The TCAP protocol provides for communication between applications in different signaling points in an SS7 network and enables the deployment of advanced intelligent network (AIN) services by supporting non-circuit related information exchange between signaling points using the SCCP connectionless service.

3. At state 3, the SCP 412 substantially immediately responds to the query with a TCAP Authorize Termination message, or other appropriate message, to the SSP 408.

4. At state 4, when the SSP 408 receives the Authorize Termination message, the call proceeds as normal, is allowed to complete, and the subscriber/customer's phone 430 begins to ring. Optionally, if the SCP 412 did not respond within a predetermined amount of time, the SSP 408 would have automatically completed the call without such a response.

5. In this example, at state 5 the SCP 412 queries the Session Manager 420 and verifies the called phone number is that of a customer (e.g., a subscriber of an service offered by the operator of the call processing system 410 and/or other entity having an account with the call processing systems), optionally by determining if the called phone number matches a customer number in the customer database 418 (or if another called party identifier is used, then a determination of that identifier matches a corresponding identifier in the customer database 418). If the called party is a customer, optionally the call processing system 410 returns one or more contacts for the called party retrieved from the contact database 416. For example, the contact record associated with the caller can be returned and transmitted to the client 432 associated with the customer for display to the customer.

6. In this example, the caller is not associated with an existing contact record in the called party's contact records stored in the database 416. At least partly in response to determining that the caller is not associated with an existing contact record, at state 6, the SCP 412 optionally queries an internal or third party CNAM (Calling Name) database 428 and/or Line Information Database (LIDB) to access the caller's name and phone type (home, work, mobile cell, etc). Optionally, the query is not limited to CNAM or LIDB type information. For example, the call processing system 410 can perform a more extensive search of third party databases and/or information accessible via Internet searches, and some or all of the following information can potentially be obtained: the caller's (or other contact's) home Web page (e.g., a uniform resource locator (URL) associated with the Web page), email address, physical address, instant messaging (IM) name/address, photos, favorite songs, preferred music type, etc. Optionally, even if the caller is associated with a contact record, the call processing system can automatically attempt to verify and/or supplement the contact record (e.g., populate one or more empty contact record fields) via CNAM, LIDB, and/or other data stores.

7. At state 7, the SCP 412 logs the incoming call for this customer including the caller's phone number, phone type, named location, and/or other information retrieved or obtained at state 6. In addition, the SCP 412 optionally creates a new contact record and automatically populates the record with some or all of the information retrieved or obtained at state 6. If the calling party's phone number is designated as private, optionally, an encrypted version of the calling party's phone number, an alias (e.g., text or an icon), or a phone number reference (e.g., a pointer that can be used to retrieve the calling party phone number from a database) is used to populate the contact record phone number field (or other appropriate field) that the customer is intended to view. Optionally, the automatically created contact record does not become a permanent part of the customer's contact list (e.g., an electronic address book or personal information manager database) until the customer provides a "save" instruction, edits the contact and/or until the number of calls from the caller (and/or caller phone number) to the called party meets and/or exceeds a threshold. Optionally, the threshold may be set by the call processing system operator and/or by the called party in the called party's account. Thus, for example, the call processing system 410 can keep track and store the call frequency from and/or to a given phone number or person. For example, if a contact record had already existed for this caller, its call frequency would have been updated.

8. In this example, the customer has an associated personal computer 432 (or other designated terminal, such as a smart phone, a PDA, an interactive television, etc.) turned on and the terminal has a telecommunication client running thereon. At state 8, the call processing system 410 determines that the client is connected to the Internet and transmits a call notification message to the computer 432, including some or all of the information regarding the caller previously retrieved or obtained. Optionally, the call notification message is encrypted by the call processing system 410, and then decrypted, in whole or in part, by the personal computer 432 (e.g., by the telecommunications client application). Optionally, as similarly discussed above, a text or an icon, that is not identical to the calling party's phone number, can be included in the call notification message for display on the computer 432 if the calling party phone number/address is restricted, wherein the calling party's phone number will not be displayed. The client then displays a call alert, providing an indication that a new call has been received and is active, and displays some or all of the caller related information (in original or modified form) to the customer.

In an example embodiment, if the client had not been connected to the Internet, the next time the client connected to the Internet, communication between the client and the call processing system 410 would be established, and the client would optionally synchronize with the session manager 420. During the synchronization process, call log information for new calls received since the last time the client performed a synchronization would be transmitted by the call processing system 410 to the client for display to the customer (optionally, call log information for older calls is transmitted as well). Similarly, new contact records would be transmitted to the client for display to the customer. The call log information and contact records can optionally be stored in nonvolatile memory on the computer 432 and can be later accessed by the user even when the computer 432 is not connected to the Internet or the call processing system 410.

Optionally, the customer's account can be configured so that the customer periodically (e.g., one an hour, once every 4 hours, once every 8 hours, once a day, once a week, etc.) receives information about newly logged calls via one or more of an email an SMS message, an IM message, a pager message, or other communication, transmitted by the Session Manager 420.

9. The customer's account is optionally configured so that the customer is notified in substantially real time by the Session Manager 420 of inbound calls via a messaging system, such via SMS, email, IM, pager, or email, optionally as designated by the customer. Thus, for example, at state 9 an SMS message, IM message, or other message type, is sent to a mobile cell phone designated in the customer's account record. Optionally, the customer's account is also configured so that the Session Manager transmits to the customer periodic (e.g., daily, hourly, or other time period) emails or other message types containing the list of calls received or made during that time period (and optionally from prior time periods), and so the current call is added to the list.

Optionally, at state 8 or at another state or later, a list of automatically created contact records are displayed via the customer client or otherwise, and the customer is asked whether the user wants to store the contact record in the customer's contact list/address book, whether the customer wants to edit/modify the contact record (e.g., modify the contact name, add additional phone numbers/fax numbers/ addresses, delete a phone number, add contact to IM buddy list, add/modify email address, add/modify SMS address, add/modify a title (e.g., Dr., president, chief technical officer, senior analyst), add/modify company name, add a contact category (e.g., personal, business, restaurants, airlines, etc.), add/modify names of the contact's family members, add/modify birth date/anniversary date information, add/modify description of favorite types of music/wine/ flower, etc.), whether the customer does not want to add the contact record to the customer's contact list/address book, and/or whether further calls from the caller associated with a given contact record is to be handled in particular way (e.g., forwarded to specific phone number/address, automatically sent to voice mail, refused, sent with a specified priority indication, etc.). If the customer modifies the contact record, the user can activate a save control, and the modified record will be stored in the customer's contact list/address book.

While in the foregoing example a contact record is created for a calling party, a contact record can also be created for a called party, optionally including a called party that is or that is not a subscriber of services provided by the call processing system 410. The following example describes the creation of a log record and an automatically created/ populated contact record where the caller is a subscriber to the services of the call processing system 410, and has associated account information stored thereon:

1. A trigger is set at the SSP 408 related to a call initiation event, such as the entry by the caller of a destination phone number/address, or the validation of a destination phone number/address, (e.g., Info Analyzed trigger). In this example, an Info Analyzed trigger is set.
2. When the caller initiates the call via a telecommunications terminal, such as the phone 430, the Info Analyzed trigger fires after the SSP 408 has gathered the called and calling party numbers via the signaling data, and the SSP 408 transmits a TCAP query to the SCP 412. Optionally instead or in addition, another calling party identifier, such as an account number or a UserID, can be included in the TCAP query. Optionally, an indication is provided as to whether the destination phone number/address is private/restricted.
3. The SCP 412 queries the Session Manager 420 and verifies the caller phone number is that of a customer, optionally by determining if the caller phone number matches a customer number in the customer database 418 (or if another called party identifier is used, then a determination of that identifier matches a corresponding identifier in the customer database 418). The SCP 412 responds in substantially real time to the query with a message (e.g., a Continue message) to the SSP 408, allowing the call origination to proceed. Optionally, if the SCP 412 does not respond to the query within a predetermined amount of time, the SSP 408 automatically proceeds with the call origination process. The SCP 412 also logs the outbound call, determines if a contact record already exists for the called party number/address in the caller's contact list/address book, and if not, creates/populates a contact record for the called party as similarly discussed above with respect to creating a call record as a result of an incoming call.

Optionally, a message including a call alert is transmitted for display and/or audible or visual playback to the caller during the call to the caller's client computer 432. In this example, information regarding the new call and an associated automatically created/populated (in whole or in part) contact record or previously created contact record is optionally displayed via the client without an active call alert indication. Some of the information can be displayed in encrypted form or other aliases can be displayed as well. Optionally, instead, a message including a call alert is transmitted in substantially real time for display to the client hosted on the caller's computer 432 even if a contact record already exists for the called party number/address in the caller's contact list/address book. Optionally, each time an outcall placed via the phone 430, or other designated customer communications terminal (e.g., mobile cell phone, landline phone, VoIP phone etc.), an alert or status update information is sent to the client hosted on the computer 432 or other client associated with the caller. Further, as similarly discussed above, a notification can be transmitted in substantially real time to the client and displayed when a call terminates. Thus, a user can be provided via the client with substantially real time call status information. Such notifications can be useful in tracking phone usage of a user's children or employees.

An example inbound call logging process will now be discussed in greater detail. In this example, a customer or other user of the call processing system services has an account set up with the call processing system. The user account information is stored in database, such as the customer database 418. The user and/or call processing system operator can specify whether inbound and/or outbound call logging information is to be stored and/or provided to the user, wherein such specification is optionally stored in the user's account record. In the following example, it is assumed that the user/customer has inbound call logging enabled.

In this example, the SSP has a TAT trigger set for those telephone numbers/lines associated with users having the inbound call logging enabled, and will not have a TAT trigger for other users or for certain other users. Optionally, instead, the TAT may be set for all calls handled by the SSP 408, or another designated subset thereof. In this example, the TAT trigger is configured with a point code associated with the call processing system SCP 412.

When an inbound call is received for the user at SSP 408, the TAT trigger fires, the TAT trigger firing causing a TCAP query to the configured point code, which in this case corresponds to the SCP 412. In an example embodiment, the message associated with the query includes at least the called party and calling party numbers/addresses. Optionally, rather than including a phone number, another identifier or an additional identifier associated with the called party can be provided. For example, an account number associated with the called party (e.g., a carrier account number, a call processing system account number, or other account number), or a UserID can be included in the TCAP query. The SCP 412 receives TCAP query, including the called party and calling party numbers. The SCP 412 queries the Session Manager 420 and verifies the called phone number is that of a customer, optionally by determining if the called phone number or other called party identifier matches a customer phone number or other identifier in the customer database 418. The SCP 412 responds substantially immediately with a TCAP message, such as a TCAP Authorized_Termination message.

The call processing system creates/adds a record corresponding to the present call to the user's call log, which is stored in the call log database 414. The record can include, by way of example, the caller's phone number, phone type (home, work, mobile, VoIP, or other), caller name (if known), and/or city/state location of the caller. Optionally, if not already stored in the call processing system records, the caller name and phone type are retrieved from a CNAM, LIDB, or other database. By way of example, the CNAM database can be provided by a third party (e.g., not the call processing system 410 or carrier 406), by the call processing system 410, or by the carrier 406. For example, CNAM support is optionally provided via the carrier's SS7 CNAM access.

If the user has not previously received a call from the caller's phone number and/or the call processing system does not contain a record of the user having received a call from the caller's phone number before, the system 410 adds a record to the user's contact list/address book with the name, phone number, phone type, and/or city/state address populated using the call signaling and/or CNAM/LIDB information. If a contact with the caller's phone number already exists in the user's contact list/address book, the call frequency statistics for that contact are optionally updated. Optionally, the contact record will only be stored permanently (e.g., for an extended period of time) in the user's electronic address book or other data store associated with the called party, if the user approves, if the user edits and/or saves the record, if the caller has called the user a predetermined number of times, and/or if the user has accepted a call from the caller a predetermined number of times.

If the client discussed above is running on the user's computer 432 (or other designated terminal) when the inbound call is received (e.g., as determined via an "alive" message transmitted by the client or otherwise), a call notification is transmitted by the system 410 to the client, and the client alerts the customer to the incoming call. For example, the client alert can be in the form of an alert window or toolbar, including some or all of the caller's phone number, phone type, name, city/state location, and other information. As part of call presentation, an audible alert, such as a ringing sound is optionally played, and a picture and/or video are displayed (e.g., a picture of video of the caller). Optionally, the alert interface can be in the form of a floating window or toolbar, or an anchored window or toolbar.

The alert interface can be configured by the user to be continuously displayed or to be displayed only when a new call alert is received and for a predetermined or varying amount of time thereafter. Optionally, the predetermined amount of time is configurable, at least in part, by the user. Optionally, the incoming call is optionally displayed in an alert interface for 5 seconds (or for a configurable period of time), and then the call information appears in a call log user interface. For example, the alert interface can be displayed in a first area of a window or tool bar, and the call log can be displayed in a second area of the window or toolbar. If the client is offline or otherwise unavailable, the new call is added to the displayed call log the next time the client comes online and synchronizes data with the call log data stored in the call processing system call log database records associated with the user.

The inbound call may have first been forwarded to the call processing system via a traditional Busy/No Answer Call Forwarding. In such a cause, the call may be logged twice. To avoid displaying two call log entries for the call to the user, the call processing system optionally determines (e.g., by comparing the times and/or call caller identification information) that the two log entries related to the same inbound call, and the call processing system then deletes one of the call log entries or combines the call log entries before transmitting the call log information for the call to the user client. Optionally, the client can determine if a call has been logged more than once, and can delete or combine the corresponding entries so that only one entry for the call is displayed in the call log. This issue of double logging a call can also be avoided if the Busy/No Answer Call Forwarding is achieved via use of IN triggers.

As similarly discussed above, in order to protect the caller's or called party's privacy and/or if needed to comply with federal or other regulations, if a caller's number or called party's phone number is designated as private or restricted, the "private" number is optionally not displayed to the user (caller or called party as appropriate). Thus, for example, the call processing system notifies the user that a call was received, but does not provide for display (e.g., via the call log, call alert, or contact record) the caller's phone number unless authorized by the calling party (e.g., in response to a request from the call processing system). The authorization can be provided through one or more voice prompt interactions, key presses, or otherwise.

The call processing system or telecommunications client application optionally automatically encrypts the caller's number with an encryption key so that the user/called party cannot read the number, and populates a contact record with the caller's encrypted phone number (or an identifier associated with the phone number), and other available, non-private information. The encryption key is stored on in the call processing system database so that the encrypted number can be later decrypted. As similarly discussed elsewhere, the user can optionally edit or add information to the record. For example, user can tag the encrypted number with a text identifier, such as the caller's name, to help the caller search for otherwise later locate and call the caller using the contact database record. The user can then instruct that the contact record be saved and closed. The user can later place calls to the caller using the stored contact information. The call log and call alert user interfaces can similarly display the caller's encrypted phone number or an identifier associated with the phone number.

In an example embodiment, the private phone number is stored on the call processing system server and an index or pointer to the phone number is stored on the user's computer system. When the user wants to later call the caller, the user initiates the transfer of the index to the call manager, which then transfers the phone number to the user's telecommunications client application. The telecommunications client application then initiates a call to the called party (e.g., via VoIP or otherwise) without displaying the actual phone number to the user. The other example processes described above can likewise be used with respect to private/restrict numbers.

The client application is optionally automatically upgradeable. For example, new or upgraded versions of the application can be downloaded over the Internet or an intranet. The download process can be performed in a variety of ways, such as in a burst mode or a trickle mode. By way of example, a trickle download process can include downloading from a remote computer system, such as an upgrade system server, to a local or client computer system an updated software application in relatively small chunks. Some or all of the chunks are optionally transmitted by the server to the client computer system spaced in part in time at a minimum predetermined time interval. This moderates the usage of the client computer system resources, allowing the client system to run foreground processes without undue interference by the trickle download process. In addition or instead of providing upgrades, the upgrade system server can be used to download or transfer other types of files, documents, and media.

Optionally, in order to tune the trickle download, the chunk size (which is optionally specified in bytes requested at a time, although other units can be used) and sleep time (seconds or other time units to sleep between chunk requests) are configurable on the upgrade system server on a global basis or on a per user basis. Optionally, default values can be set for the chunk size and/or the sleep time.

By way of further example, the burst download process optionally will not attempt to moderate or to significantly moderate the utilization of the client computer system resources during the application or update download, and will instead download the update as quickly as the available resources will allow. For example, a burst mode will not restrict the chunk size, or may permit a much larger chunk size than the trickle mode, such as a chunk size that is five, ten, twenty, one hundred, or a thousand times (or other integer or non-integer multiple greater than one) the trickle mode chunk size. Examples of download processes and apparatus that can be used to download/upgrade the client application and other software are described in copending in U.S. patent application Ser. No. 11/040,185, filed 21 Jan. 2005, entitled Methods and Systems for Transferring Data Over a Network, the content of which is incorporated herein in its entirety by reference.

An example outbound call logging process will now be discussed in greater detail. A customer or other user has outbound call logging enabled. A trigger, such as an Info_Analyzed trigger, is set in the SSP 408 for the user/customer's phone number or for all calls handled by the SSP 408. The trigger is configured with the point code of the SCP 412.

When the trigger fires, the SCP 412 receives a TCAP Info_Analyzed message containing the called party and calling party numbers. The SCP 412 responds immediately to the SSP 408 with a message, such as a TCAP Continue message. The call processing system logs the outbound call in the user's call log and creates a contact record as similarly discussed above with respect to inbound call handling, except the record is created for the party associated with the called party number rather than for the calling party.

FIG. 5 illustrates an example call log user interface which can be displayed via a user's communication client or via another application. The information displayed via the user interface can be updated by synchronizing with the call processing system database subsystem data upon the client connecting to the call processing system (or within a configurable period of time after coming online or connecting to the call processing system) and/or during the connection thereafter. In this example, the user interface includes a first area 504 that provides information on the number of new calls that have been received since the client was last closed/disconnected from the call processing system. If the user is associated with multiple telecommunication clients, optionally, the first area 504 will display the number of new inbound and/or outbound calls (e.g., directed to a given phone number/address of a user or to a plurality of phone numbers/addresses associated with the user as stored in the user's account record, or placed from a given user line/address/terminal) that have occurred since all of those clients were last closed/disconnected or a specified subset thereof (e.g., as specified in the user's account record). Optionally, during a given session, the call number will be updated as new calls are received via one or more SSPs or otherwise, and/or as new calls are initiated by the user.

Optionally, the first area 504 also displays the number of old calls, the total number of calls and/or the total number of calls since a specified date or within a specified period (e.g., today, yesterday, the current week, the current month, the last four weeks, the last 10 days, etc.).

A second area 506, sometimes referred to as a "calls field", displays call information for the new calls and optionally for old/older calls as well. For example, an icon or text is optionally provided which indicates, if known, from where the call was placed for inbound calls (e.g., mobile cell phone, work phone, home phone, VoIP phone etc.), and to where a call was directed (e.g., mobile cell phone, work phone, home phone, VoIP phone etc.) for outbound calls. In addition, the caller/called party name or other identifier is displayed, if such information is available. The call date and time are optionally also displayed. An indication is optionally displayed (e.g., via an icon or text) that indicates whether a call was an inbound call (e.g., placed to the user) or an outbound call (e.g., placed by the user). An indication is optionally provided as to whether there is a recorded message from a caller and whether the user has already listened to the recording.

Optionally, the user can specify, via a menu, whether the call log is to be sorted based on date/time (e.g., where the most recent call is displayed first, the next most recent call displayed second, and so on), by name, by type (e.g., inbound or outbound, for example, wherein the inbound calls are displayed first, sorted by date/time, and the outbound calls are then listed, sorted by date/time), or by call source/destination (e.g., home, work, mobile, etc.). Via the user interface, the user can select a call (e.g., by using a mouse, arrow keys or other user input device) and activate a delete key to delete it from the record. Optionally, the number of calls displayed in first area 504 will decrease to reflect the deletion. Optionally, a play control is provided, which, when activated by the user, will cause a message recorded by a caller associated with a selected call to be played via the host (e.g., personal computer) hosting the call log or otherwise.

A third area 508, sometimes referred to as a "contacts field", displays a contact record associated with a call selected in the second area 506. This contact record can be automatically created/populated, as described above, for either an inbound or an outbound call, or may have been manually created by the user or imported from a user's electronic address book. If the user activates an edit control 510, the user can edit the record (e.g., add, modify, or delete information). If the user activates a "new" control, a blank record is presented to the user in the third area 508, in a pop-up window, or otherwise, with fields into which the user can enter contact information. The user can also select a telephone number/address (or a code, identifier, or control associated with a telephone number/address) in the third area 508, activate a "call now" control 502, and a call will be placed (e.g., via VoIP or PSTN) to the selected number by the host.

An example inbound call alerting process and user interface will now be described in greater detail with reference to FIG. 6. If a user has the Inbound Call Alerting feature enabled, an online communications client, such as that hosted on computer 432, is notified of an inbound call so that the client can alert the user. The inbound call information presented via a call alert user interface 602 optionally includes the caller's phone number 610, phone type, name 606 (if known), and city/state location 608 by way of example. In addition, the caller alert user interface 602 optionally dynamically displays call status information 612 received by the client from the call processing system. For example, the status information can indicate that an incoming call is ringing (e.g., "ringing" or "incoming call"), that the call processing system has answered the call and is playing a greeting (e.g., "greeting caller"), that the call processing system is recording a message from the caller ("recording message"), or that the call has been terminated (e.g., "call terminated" or "hang-up"). Optionally, when the user interface illustrated in FIG. 6 is expanded, it takes the form of the user interface illustrated in FIG. 5, and includes a logged call area and a contacts area.

As part of call presentation, a ringing sound is optionally played via the client host, and/or a picture/video is displayed. Optionally, the incoming call is displayed in a call alert user interface for a first amount of time (e.g., a set time, such as 5 seconds, or for a user configurable period of time), and then the call appears in the associated call log. Optionally, a "take call" control 604 is provided, that when activated, causes the user to be connected to the caller if the inbound call is still in progress. The user can be connected via the host (e.g., computer 432), or via another specified telecommunications terminal (e.g., a POTs phone, a mobile cell phone, a VoIP phone). In an example embodiment, if the user has more than one destination phone number/address configured in the user's account record (e.g., home phone, work phone, mobile phone, VoIP phone, etc.), a menu (e.g., a drop down menu, a pop-up menu, etc.) is provided listing some or all of the destination phone numbers/addresses, from which the user can select. The call is then forwarded/connected to the selected destination. Optionally, the call log user interface and the call alert user interface are part of the same user interface and displayed at the same time.

Optionally, if the user's account is configured so that the user is to receive SMS call notifications, each inbound call results in an SMS message being sent in substantially real time (or delayed) to the SMS address designated by the user (e.g., the user's cell phone). For example, the message can include some or all of the following: the caller's name (if known), phone number, terminal type (e.g., home, work, mobile, etc.), city/state, and/or other information. Similarly, the inbound call information can be transmitted to an IM address, wherein the user can receive the information by an IM client (e.g., hosted on a phone, computer, interactive television, etc.)

As similarly discussed above, the user's account can optionally be configured to receive a carrier-branded email or other message type periodically (e.g., one an hour, once every 4 hours, once every 8 hours, daily, weekly, etc.) containing a log of their inbound and/or outbound calls for that time period. The message can be carrier-branded and/or branded with a brand associated with the call processing system. FIG. 7 illustrates example email content. The example email includes a "from" field 702 that provides the sender's email address and/or other identifier (e.g., carrier name and department, such as message center), a subject field 704 (e.g., that states that the subject is related to phone calls from and/or to a given phone number/address), a "to" field, and a call log 708. For example, the call log can include some or all of the information discussed above with respect to FIG. 5. In the illustrated example, the call log includes the calling or called party name (if known), an indication as to whether the call was inbound (e.g., "from") or outbound (e.g., "to"), origination/destination phone number/address, and date/time of each call, by way of an example.

Optionally, the message (the email message illustrated in FIG. 7) including the call log will also include information and/or a link regarding such services and/or additional services that the recipient can subscribe to. An unsubscribe link is also provided, which, when activated generates an email to an "unsubscribe" email, IM, or SMS address associated with the call processing system. If the call processing system receives such an unsubscribe message, the call processing system automatically changes the corresponding instruction in the user's account record to indicate that the user is not to receive such call log notification communications.

Optionally, the call log, contact record/address book, and/or call alert can be presented to the user via a browser that accesses a Web page or other page type that presents some or all of the corresponding call log, contact record/address book, and/or call alert information discussed elsewhere herein. Thus, a user can access such information from a terminal equipped with a browser (e.g., a general purpose browser such as Microsoft Explorer, Mozilla Firefox, Netscape, etc.) or other user interface to network resources, without having to download a specifically configured client. Optionally, the user may be requested to enter a valid user identifier and/or a password in order to access such information via the Web page.

Figure 8:
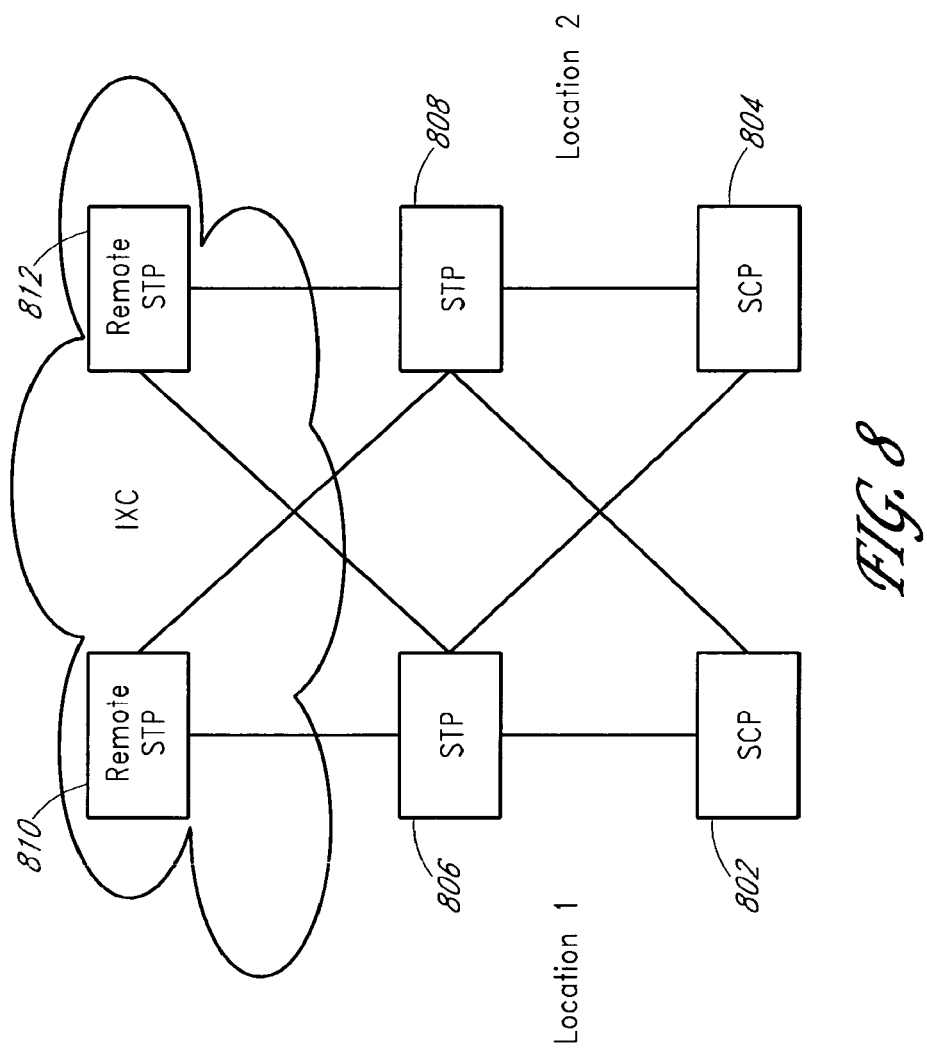
FIG. 8 illustrates an example communications topology.

FIG. 8 illustrates another example network topology that can be utilized with respect to the processes described herein. This example provides redundant components to enhance system reliability and availability. In this example, two (or more) geographically separated (e.g., in different cities, states, or countries), SCPs 802, 804 are stateless and so they can share an SS7 point code. The SCPs 802, 804 are associated with a call processing system, such as the softswitch 410, illustrated in FIG. 4A. For example, SCP 412 can include SCPs 802, 804. The SCPs 802, 804 are connected to each of the geographically separated STPs 806, 808 to give a high availability configuration. Optionally, the STPs 806, 808 are associated with the same call processing system as the SCPs 802, 804. The STPs 806, 808 in turn have a high availability connection to two remote STPs 810, 182 in the interexchange carrier network. Advantageously, even though the network topology is redundant, the triggers can be configured in the SSPs, such as SSP 408, to continue call processing if a response is not received from a call processing system SCP within a specified time period (e.g., 2 seconds). Thus, even in a catastrophic failure, where the call processing system SCPs are not able to respond, the carrier customer's call processing service is not impacted.

While the foregoing detailed description discloses several example embodiments, it should be understood that this disclosure is illustrative only and is not limiting of the present invention. It should be appreciated that the specific configurations and operations disclosed can differ from those described above, and that the methods described herein can be used in other contexts.

What is claimed is:

1. A computer storage system comprising a non-transitory storage device, said computer storage system having stored thereon executable program instructions that direct a computer system to at least:
   record a unique phone number assigned to a user, wherein the unique phone number is not a wireless phone number of the user and the unique phone number is not a wireline phone number of the user;
   maintain a user contact data store that comprises contact records accessible and editable by the user via a user interface of at least one Internet-connected computing device of the user, wherein at least a portion of the editable contact records are configured to be used in call presentations to the user on respective calls from callers corresponding to respective editable call records subsequent to creation of the respective editable call records;

receive a call directed to the unique phone number, the call including call related information, the call related information including at least an identifier associated with a calling party;

access the user contact data store;

use the received identifier associated with the calling party to retrieve a contact record;

present the call directed to the unique phone number to the user on an Internet-connected computing device of the user, wherein the call presentation includes at least a portion of the retrieved contact record editable by the user; and transmit over a network a message during the call, the message including at least a portion of the call related information, to a networked application, wherein the networked application is hosted on a second Internet-connected computing device of the user.

2. The system as defined in claim 1, wherein the identifier associated with the calling party is a phone number or an account number.

3. The system as defined in claim 1, wherein at least a portion of the received call related information is stored in association with a call event in a call log of the user.

4. The system as defined in claim 1, wherein the executable program instructions further direct the computer system to: provide, via the user interface of the Internet-connected computing device of the user, an originate call control in association with at least one contact record of the user contact data store.

5. The system as defined in claim 1, wherein the retrieved contact record includes two or more of: a city associated with the calling party, a state associated with the calling party, a name associated with the calling party, a type of calling device associated with the call, a locator corresponding to a web page associated with the calling party, an email address associated with the calling party, a SIP address associated with the calling party, a wireless phone number associated with the calling party, a street address associated with the calling party.

6. The system as defined in claim 1, that further direct the computer system to: transmit over a network a message during the call, the message including at least a portion of the retrieved contact record, wherein the message is transmitted as a short message service message or email message to the user.

7. The system as defined in claim 1, wherein the executable program instructions further direct the computer system to: cause at least a portion of the call related information to be stored in the user contact data store.

8. The system as defined in claim 1, wherein at least a portion of contact information of the retrieved contact record is editable by the user via a Web browser.

9. The system as defined in claim 1, wherein the computer system further comprises an Internet Protocol interface to one or more public switched telephone networks.

10. A computer storage system comprising a non-transitory storage device, said computer storage system having stored thereon executable program instructions that direct a computer system to at least:

maintain a user contact data store in association with an application software program hosted on an Internet-connected computing device of the user, the user contact data store comprising editable contact records, wherein the computer system is configured to detect an online presence of the application software program hosted on the Internet connected computing device of the user, and wherein at least a portion of the editable contact records are configured to be used in call presentations to the user on respective calls from callers corresponding to respective editable call records subsequent to creation of the respective editable call records;

receive a call, the call including call related information, the call related information including at least an identifier associated with a calling party;

access the user contact data store;

use the received identifier associated with the calling party to retrieve an editable contact record from the contact data store;

present the call to the user on the Internet-connected computing device of the user, wherein the call presentation includes at least a portion of the retrieved contact record editable by the user;

transmit over a network a message during the call, the message including at least a portion of the call related information, to a networked application, wherein the networked application is hosted on a second Internet-connected computing device of the user.

11. The system as defined in claim 10, wherein the identifier associated with the calling party comprises a phone number or an account number.

12. The system as defined in claim 10, wherein at least a portion of the received call related information is stored in association with a call event in a call log of the user.

13. The system as defined in claim 10, wherein the executable program instructions further direct the computer system to: provide, via a user interface of the application software program hosted on the Internet-connected computing device of the user, an originate call control in association with a contact record.

14. The system as defined in claim 10, wherein the retrieved contact record includes two or more of: a city associated with the calling party, a state associated with the calling party, a name associated with the calling party, a type of calling device associated with the call, a locator corresponding to a web page associated with the calling party, an email address associated with the calling party, a SIP address associated with the calling party, a wireless phone number associated with the calling party, a street address associated with the calling party.

15. The system as defined in claim 10, wherein the executable program instructions further direct the computer system to: transmit over a network a message during the call, the message including at least a portion of the retrieved contact record, wherein the message is transmitted as a short message service message or email message to the user.

16. The system as defined in claim 10, wherein the executable program instructions further direct the computer system to: cause at least a portion of the call related information to be stored in the user contact data store.

17. The system as defined in claim 10, wherein at least a portion of contact information of the contact record is editable by the user via a Web browser.

18. The system as defined in claim 10, wherein the computer system further comprises an Internet Protocol interface to one or more public switched telephone networks.

19. A computer storage system comprising a non-transitory storage device, said computer storage system having stored thereon executable program instructions that direct a computer system to at least:

maintain a user contact data store that comprises contact records accessible and editable by a user via a user interface on an Internet-connected computing device of the user,
        wherein at least a portion of the editable contact records are configured to be used in call presentations to the user on respective calls from callers corresponding to respective editable call records subsequent to creation of the respective editable call records;
    receive a call, the call including call related information, the call related information including at least an identifier associated with a calling party;
    access the user contact data store;
    use the received identifier associated with the calling party to retrieve a contact record;
    present the call to the user on the Internet-connected computing device of the user, wherein the call presentation includes at least a portion of the retrieved contact record editable by the user; and
    transmit over a network a message during the call, the message including at least a portion of the call related information, to a networked application, wherein the networked application is hosted on a second Internet-connected computing device of the user.

\* \* \* \* \*